US008307271B1

(12) United States Patent
Liu et al.

(10) Patent No.: US 8,307,271 B1
(45) Date of Patent: Nov. 6, 2012

(54) FAST VERIFICATION OF DATA BLOCK CYCLE REDUNDANCY CHECKS

(75) Inventors: Zhi-Gang Liu, Westford, MA (US); Steven McClure, Northboro, MA (US); Alesia Tringale, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 545 days.

(21) Appl. No.: 12/586,097

(22) Filed: Sep. 17, 2009

(51) Int. Cl.
G06F 11/10 (2006.01)
(52) U.S. Cl. ........................................ 714/807
(58) Field of Classification Search .................. 714/758, 714/763, 802, 807
See application file for complete search history.

(56) References Cited

U.S. PATENT DOCUMENTS

| | | | |
|---|---|---|---|
| 5,206,939 A | 4/1993 | Yanai et al. | |
| 5,742,792 A | 4/1998 | Yanai et al. | |
| 5,778,394 A | 7/1998 | Galtzur et al. | |
| 5,845,147 A | 12/1998 | Vishlitzky et al. | |
| 5,857,208 A | 1/1999 | Ofek | |
| 5,935,268 A * | 8/1999 | Weaver | 714/758 |
| 6,108,812 A * | 8/2000 | Born | 714/807 |
| 7,020,811 B2 * | 3/2006 | Byrd | 714/703 |
| 7,024,618 B2 * | 4/2006 | Luick | 714/800 |
| 7,036,066 B2 * | 4/2006 | Weibel et al. | 714/752 |
| 7,073,024 B1 | 7/2006 | Chilton | |
| 7,191,382 B2 * | 3/2007 | James et al. | 714/769 |
| 7,203,890 B1 * | 4/2007 | Normoyle | 714/768 |
| 7,398,449 B1 * | 7/2008 | Normoyle et al. | 714/767 |
| 2006/0069887 A1 | 3/2006 | LeCrone et al. | |

OTHER PUBLICATIONS

Tenkasi V. Ramabadran and Sunil S. Gaitonde, "A Tutorial on CRC Computations," *IEEE Micro*, vol. 8, Issue 4, Aug. 1988, pp. 62-75.

* cited by examiner

*Primary Examiner* — James C Kerveros
(74) *Attorney, Agent, or Firm* — Muirhead and Saturnelli, LLC (57) ABSTRACT

Detecting data errors in connection with a data transfer process includes performing an XOR operation on a plurality of data blocks to obtain a data block XOR result. An XOR operation may be performed on a plurality of cyclic redundancy check (CRC) codes associated with the plurality of data blocks to obtain a CRC XOR result. The data block XOR result and the CRC XOR result may be used to determine whether an error exists in the plurality of data blocks. The system may be used in connection with local IO transfers and in connection with local CPU XOR operations for a RAID system in which data may be mirrored, striped or otherwise distributed across multiple storage devices.

18 Claims, 10 Drawing Sheets

FAST VERIFICATION OF DATA BLOCK CYCLE REDUNDANCY CHECKS

TECHNICAL FIELD

The present application relates to the field of data storage for computers and, more particularly, to error detection for data on a storage device.

BACKGROUND OF THE INVENTION

Host processor systems may store and retrieve data using a storage device containing a plurality of host interface units (host adapters), disk drives, and disk interface units (disk adapters). Such storage devices are provided, for example, by EMC Corporation of Hopkinton, Mass., and disclosed in U.S. Pat. No. 5,206,939 to Yanai et al., U.S. Pat. No. 5,778,394 to Galtzur et al., U.S. Pat. No. 5,845,147 to Vishlitzky et al., and U.S. Pat. No. 5,857,208 to Ofek. The host systems access the storage device through a plurality of channels provided therewith. Host systems provide data and access control information through the channels of the storage device and the storage device provides data to the host systems also through the channels. The host systems do not address the disk drives of the storage device directly, but rather, access what appears to the host systems as a plurality of logical volumes. The logical volumes may or may not correspond to the actual disk drives.

A cyclic redundancy check (CRC) is an error-detecting code. A CRC-enabled sending/storing device calculates a short, fixed-length binary sequence, known as the CRC code or just CRC, for each block of data and sends or stores the CRC with the data block. When the data block is read or received, the reading/receiving device repeats the calculation; if the new CRC does not match the one calculated earlier, or otherwise indicates an inconsistency, then the data block contains a data error and the reading/receiving device may take corrective action such as rereading or requesting the data block be sent again. The CRC may be 16-bit protection word provided to ensure data integrity per data block in data interchange format (DIF). The computation of the CRC may resemble a long division operation in which the quotient is discarded and the remainder becomes the result, although the arithmetic used is carry-less arithmetic of a finite field. For a general discussion of CRC computations, see "A Tutorial on CRC Computations," IEEE Micro, Vol. 8, Issue 4, 1988, pp. 62-75, which is incorporated herein by reference.

In a storage device, a CPU local transfer mode, including I/O and XOR operations, may be provided to allow the CPU to move data between global memory and local control storage spaces for global memory stored locally to the CPU. For I/O data in DIF format, the CPU may check each data block's CRC to verify its integrity. With known CRC computation algorithms, each data block (512 byte) may require at least approximately 350 ns for the CPU to compute the DIF CRC (using, for example, an Intel Core-2 microprocessor). In comparison, the CPU needs only approximately 30 ns to complete a simple data copy (without CRC verification). Thus, the DIF CRC computation for verification may slow down local data transfer by a factor of 10. For example, for a 64K Read-Hit benchmark, the CRC computing may consume 60% (or even higher) of total CPU cycles. Generally, known CRC verification techniques may be unacceptably inefficient when implemented using software.

Accordingly, it would be desirable to provide a system that more efficiently verifies data block CRCs for error detecting and related operations.

SUMMARY OF THE INVENTION

According to the system described herein, a method for detecting data errors in connection with a data transfer process includes performing an XOR operation on a plurality of data blocks to obtain a data block XOR result. An XOR operation is performed on a plurality of error detecting codes associated with the plurality of data blocks to obtain an error detecting code XOR result. The data block XOR result and the error detecting code XOR result to determine whether an error exists in the plurality of data blocks. The plurality of error detecting codes may be cyclic redundancy checks (CRCs) and the CRCs may be in data interchange format (DIF). Determining whether an error exists in the plurality of data blocks may include computing a CRC of the data block XOR result and comparing the computed CRC to the error detecting code XOR result. The data block XOR result and the error detecting code XOR result may be stored in a memory. The plurality of data blocks may be transmitted from a data source. The data transfer process may include distributing mirrored versions of the data blocks across multiple storage devices. At least one of the plurality of data blocks includes a plurality of data portions that are distributed across multiple storage devices. Parity information is generated and stored for the plurality of data portions. The data block XOR result may be generated by applying the XOR operation to the parity information.

According further to the system described herein, a computer readable storage medium storing executable code for detecting data errors in connection with a data transfer process includes executable code that performs an XOR operation on a plurality of data blocks to obtain a data block XOR result. Executable code is provided that performs an XOR operation on a plurality of error detecting codes associated with the plurality of data blocks to obtain an error detecting code XOR result. Executable code is provided that uses the data block XOR result and the error detecting code XOR result to determine whether an error exists in the plurality of data blocks. The plurality of error detecting codes may be cyclic redundancy checks (CRCs) and the CRCs may be in data interchange format (DIF). The data block XOR result and the error detecting code XOR result may be stored in a memory. The plurality of data blocks may be transmitted from a data source. Determining whether an error exists in the plurality of data blocks may include computing a CRC of the data block XOR result and comparing the computed CRC to the error detecting code XOR result. The data transfer process may include distributing mirrored versions of the data blocks across multiple storage devices. At least one of the plurality of data blocks may include a plurality of data portions that are distributed across multiple storage devices. Parity information is generated and stored for the plurality of data portions. The data block XOR result may be generated by applying the XOR operation to the parity information.

According further to the system described herein, a computer system for detecting data errors in connection with a data transfer process includes a plurality of interconnected directors, wherein at least some of the directors handle reading and writing data for the computer storage device. A plurality of disk drives, coupled to at least some of the directors, store data for the computer system. Computer software, stored in a computer readable storage medium of at least one of the directors, is provided that includes executable code that performs an XOR operation on a plurality of data blocks to obtain a data block XOR result. Executable code is provided that performs an XOR operation on a plurality of error detecting codes associated with the plurality of data blocks to obtain an error detecting code XOR result. Executable code that is provided uses the data block XOR result and the error detecting code XOR result to determine whether an error exists in the plurality of data blocks. The plurality of error detecting codes may be cyclic redundancy checks (CRCs) and the CRCs may be in data interchange format (DIF). The data block XOR result and the error detecting code XOR result may be stored in a memory. The plurality of data blocks may be transmitted from a data source. Determining whether an error exists the plurality of data blocks may include computing a CRC of the data block XOR result and comparing the computed CRC to the error detecting code XOR result. The data transfer process may include distributing mirrored versions of the data blocks across multiple storage devices. At least one of the plurality of data blocks includes a plurality of data portions that are distributed across multiple storage devices. Parity information is generated and stored for the plurality of data portions. The data block XOR result may be generated by applying the XOR operation to the parity information.

BRIEF DESCRIPTION OF THE DRAWINGS

Embodiments of the system described herein are explained below in detail with reference to the several figures of the drawings that are briefly described as follows.

DETAILED DESCRIPTION OF VARIOUS EMBODIMENTS

Figure 1:
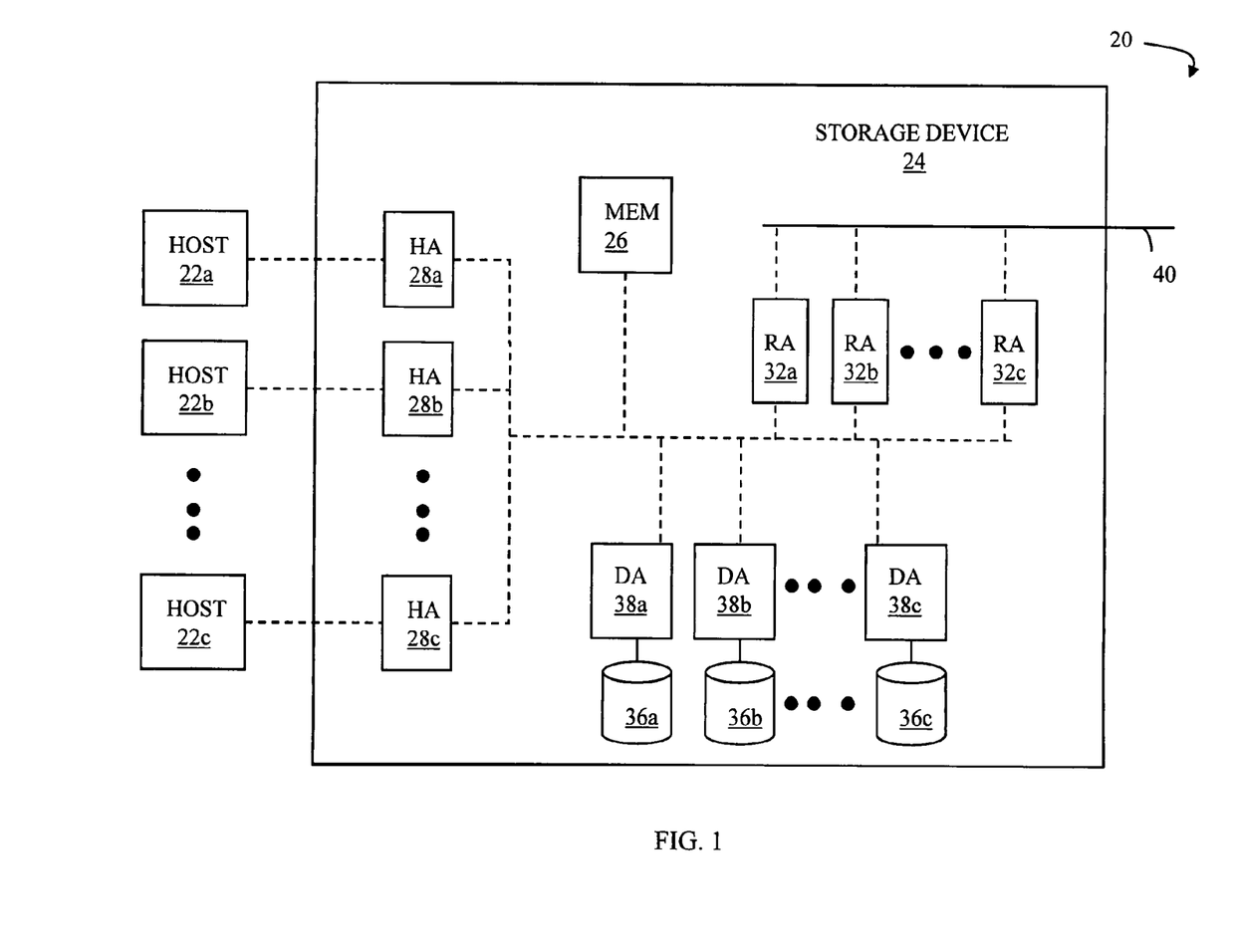
FIG. 1 is a schematic diagram showing a plurality of hosts and a data storage device that may be used in connection with the system described herein.

FIG. 1 is a schematic diagram 20 showing a plurality of hosts 22a-22c coupled to a data storage device 24. The data storage device 24 includes a memory 26 that facilitates operation of the storage device 24, as further described elsewhere herein. The data storage device also includes a plurality of host adapters (HA's) 28a-28c that handle reading and writing of data between the hosts 22a-22c and the storage device 24. Although the diagram 20 shows each of the hosts 22a-22c coupled to each of the HA's 28a-28c, it will be appreciated by one of ordinary skill in the art that one or more of the HA's 28a-28c may be coupled to other hosts.

The storage device 24 may include one or more Remote Data Facility (RDF) adapter units (RA's) 32a-32c. An RDF product, such as produced by EMC Corporation of Hopkinton, Mass., may be used to copy data from one storage device to another. For example, if a host writes data to a first storage device (e.g., a local storage device), it may be desirable to copy that data to a second storage device provided in a different location (e.g., a remote storage device). The RA's 32a-32c are coupled to an RDF link 40 and are similar to the HA's 28a-28c, but are used to transfer data between the storage device 24 and other storage devices (see FIG. 3 and corresponding discussion) that are also coupled to the RDF link 40. The storage device 24 may be coupled to additional RDF links (not shown) in addition to the RDF link 40. For further discussion of RDF and the use thereof in data recovery and storage techniques, see, for example, U.S. Pat. No. 5,742,792 to Yanai, et al., entitled "Remote Data Mirroring" and U.S. Patent App. Pub. No. 2006-0069887 to LeCrone, et al., entitled "Triangular Asynchronous Replication," which are incorporated herein by reference.

The storage device 24 may also include one or more disks 36a-36c, each containing a different portion of data stored on the storage device 24. Each of the disks 36a-36c may be coupled to a corresponding one of a plurality of disk adapter units (DA) 38a-38c that provides data to a corresponding one of the disks 36a-36c and receives data from a corresponding one of the disks 36a-36c. The disks 36a-36c may include any appropriate storage medium or mechanism, including hard disks, solid-state storage (flash memory), etc. Note that, in some embodiments, it is possible for more than one disk to be serviced by a DA and that it is possible for more than one DA to service a disk.

The logical storage space in the storage device 24 that corresponds to the disks 36a-36c may be subdivided into a plurality of volumes or logical devices. The logical devices may or may not correspond to the physical storage space of the disks 36a-36c. Thus, for example, the disk 36a may contain a plurality of logical devices or, alternatively, a single logical device could span both of the disks 36a, 36b. The hosts 22a-22c may be configured to access any combination of logical devices independent of the location of the logical devices on the disks 36a-36c. A device, such as a logical device described above, has a size or capacity that may be expressed in terms of device geometry. The device geometry may include device geometry parameters regarding the number of cylinders in the device, the number of heads or tracks per cylinder, and the number of blocks per track, and these parameters may be used to identify locations on a disk. Other embodiments may use different structures.

One or more internal logical data path(s) exist between the DA's 38a-38c, the HA's 28a-28c, the RA's 32a-32c, and the memory 26. In some embodiments, one or more internal busses and/or communication modules may be used. In some embodiments, the memory 26 may be used to facilitate data transferred between the DA's 38a-38c, the HA's 28a-28c and the RA's 32a-32c. The memory 26 may contain tasks that are to be performed by one or more of the DA's 38a-38c, the HA's 28a-28c and the RA's 32a-32c and a cache for data fetched from one or more of the disks 36a-36c. Use of the memory 26 is further described elsewhere herein in more detail.

The storage device 24 may be provided as a stand-alone device coupled to the hosts 22a-22c as shown in FIG. 1 or, alternatively, the storage device 24 may be part of a storage area network (SAN) that includes a plurality of other storage devices as well as routers, network connections, etc. The storage device may be coupled to a SAN fabric and/or be part of a SAN fabric. The system described herein may be implemented using software, hardware, and/or a combination of software and hardware where software may be stored in a computer readable storage medium and executed by one or more processors.

Figure 2:
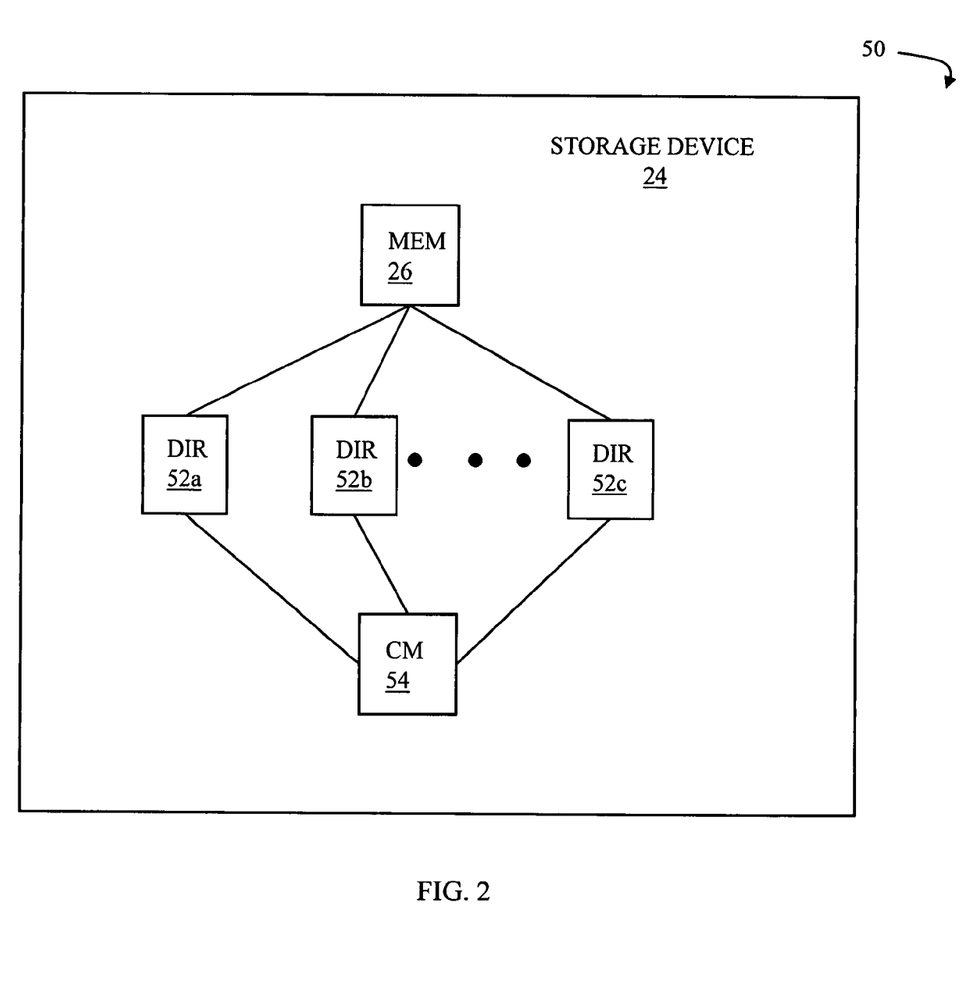
FIG. 2 is a schematic diagram showing a storage device, memory, a plurality of directors, and a communication module that may be used in connection with the system described herein.

FIG. 2 is a schematic diagram 50 illustrating an embodiment of the storage device 24 where each of a plurality of directors 52a-52c are coupled to the memory 26. Each of the directors 52a-52c may represent one of the HA's 28a-28c, RA's 32a-32c, and/or DA's 38a-38c. In an embodiment disclosed herein, there may be up to sixty four directors coupled to the memory 26. Of course, for other embodiments, there may be a higher or lower maximum number of directors that may be used.

The diagram 50 also shows an optional communication module (CM) 54 that provides an alternative communication path between the directors 52a-52c. Each of the directors 52a-52c may be coupled to the CM 54 so that any one of the directors 52a-52c may send a message and/or data to any other one of the directors 52a-52c without needing to go through the memory 26. The CM 54 may be implemented using conventional MUX/router technology where a sending one of the directors 52a-52c provides an appropriate address to cause a message and/or data to be received by an intended receiving one of the directors 52a-52c. Some or all of the functionality of the CM 54 may be implemented using one or more of the directors 52a-52c so that, for example, the directors 52a-52c may be interconnected directly with the interconnection functionality being provided on each of the directors 52a-52c. In addition, a sending one of the directors 52a-52c may be able to broadcast a message to all of the other directors 52a-52c at the same time.

In some embodiments, one or more of the directors 52a-52c may have multiple processor systems thereon and thus may be able to perform functions for multiple directors. In some embodiments, at least one of the directors 52a-52c having multiple processor systems thereon may simultaneously perform the functions of at least two different types of directors (e.g., an HA and a DA). Furthermore, in some embodiments, at least one of the directors 52a-52c having multiple processor systems thereon may simultaneously perform the functions of at least one type of director and perform other processing with the other processing system. In addition, the memory 26 may be a global memory in which all or at least part of the global memory may be provided on one or more of the directors 52a-52c and shared with other ones of the directors 52a-52c. The memory 26 may be part of a global memory distributed across the processor systems of more than one storage device and accessible by each of the storage devices.

Note that, although specific storage device configurations are disclosed in connection with FIGS. 1 and 2, it should be understood that the system described herein may be implemented on any appropriate platform. Thus, the system described herein may be implemented using a platform like that described in connection with FIGS. 1 and 2 or may be implemented using a platform that is somewhat or even completely different from any particular platform described herein.

Figure 3:
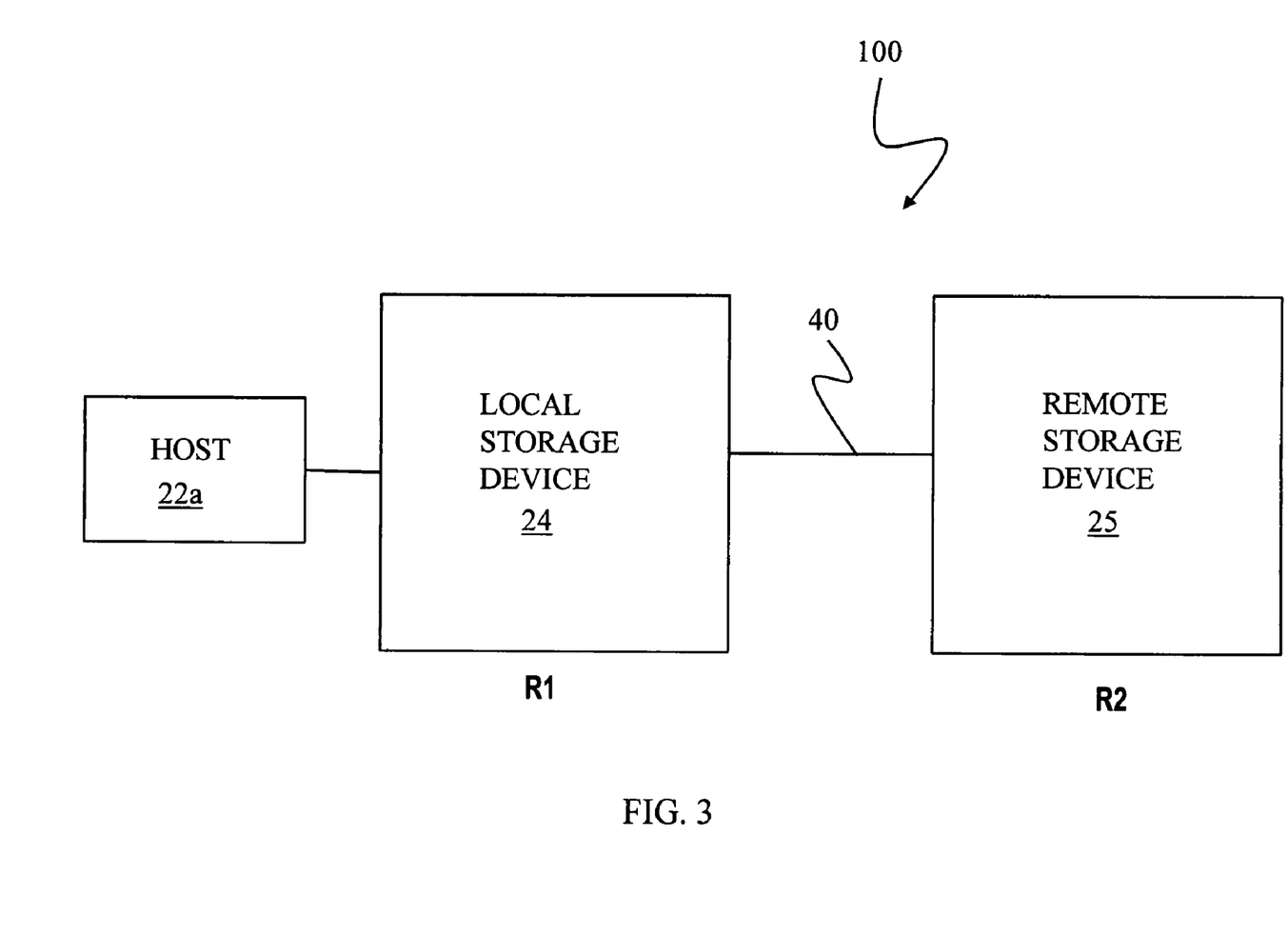
FIG. 3 is a schematic diagram showing a storage system including the storage device, as a local storage device, coupled to a remote storage device via an RDF link that may be used in connection with an embodiment of the system described herein.

FIG. 3 is a schematic diagram showing a storage system 100 including the storage device 24, as a local storage device, coupled to a remote storage device 25 via the RDF link 40. The remote storage device 25 may be the same type of storage device as the storage device 24, and have similar components as described with respect to the storage device 24, and/or may be a different type of storage device. The local storage device 24 and the remote storage device 25 may operate as an RDF product for providing backup and/or mirrored copies of data, as further discussed elsewhere herein. The RDF functionality described herein may be applied so that the data for at least a portion of the disks 36a-36c of the local storage device 24 is copied, using RDF, to at least a portion of similar disks of the remote storage device 25. It is possible that other data of the storage devices 24, 25 is not copied between the storage devices 24, 25 and, thus, the data stored on the storage devices 24, 25 may not be identical.

Providing an RDF mapping between portions of the local storage device 24 and the remote storage device 25 involves setting up a logical device on the remote storage device 25 that is a remote mirror for a logical device on the local storage device 24. One or more of the hosts 22a-c, for example the host 22a, may read and write data from and to the logical device on the local storage device 24 and the RDF mapping causes modified data to be transferred from the local storage device 24 to the remote storage device 25 using the RA's 32a-32c, similar RA's on the remote storage device 25 and the RDF link 40. In steady state operation, the logical device on the remote storage device 25 may contain data that is a copy of, or at least substantially identical to, the data of the logical device on the local storage device 24. The logical device on the local storage device 24 that is accessed by the host 22a may be referred to as the "R1 volume" (or just "R1") while the logical device on the remote storage device 25 that contains a copy of the data on the R1 volume is called the "R2 volume" (or just "R2"). Thus, the host reads and writes data from and to the R1 volume and RDF handles automatic copying and updating of the data from the R1 volume to the R2 volume and/or from the R2 volume to the R1 volume in accordance with the system described herein.

In an embodiment, the system described herein may be used in connection with SRDF synchronous (SRDF/S) transfers. For an SRDF/S transfer, data written from one of the hosts 22a-c to the local storage device 24 may be stored locally, for example on one of the data volumes 36a-c of the local storage device 24. After data is written from one or more of the hosts 22a-c to the local storage device 24, the data is transferred from the local storage device 24 to the remote storage device 25 using RDF. Receipt by the remote storage device 25 is then acknowledged to the local storage device 24 which then provides an acknowledge back to the appropriate one of the hosts 22a-c for the initial write. In other embodiments, the system described herein may also be used in connection with, or in combination with, other modes of data transfer including, for example, asynchronous (SRDF/A) transfers and/or other appropriate data transfer systems and devices.

In connection with operation of the system described herein, it may be necessary or desirable to perform error detection operations on data blocks transferred or otherwise moved within or between storage devices. As further discussed elsewhere herein, a cyclic redundancy check (CRC) may be used for this purpose. A CRC-enabled sending/storing device calculates a short, fixed-length binary sequence (the CRC) for each block of data and sends or stores the CRC with the data block. When the data block is read or received the reading/receiving device repeats the calculation; if the new CRC does not match the one calculated earlier, or otherwise indicates an inconsistency, then the data block contains a data error and the reading/receiving device may take corrective action such as rereading or requesting the data block be sent again. As previously noted, with known techniques for verification CRC computations, particularly with DIF CRC, the verification CRC computations may significantly slow down data transfer rates. The system described herein addresses this issue and provides for more efficient verification of data block CRCs for error detecting and related operations.

Figure 4:
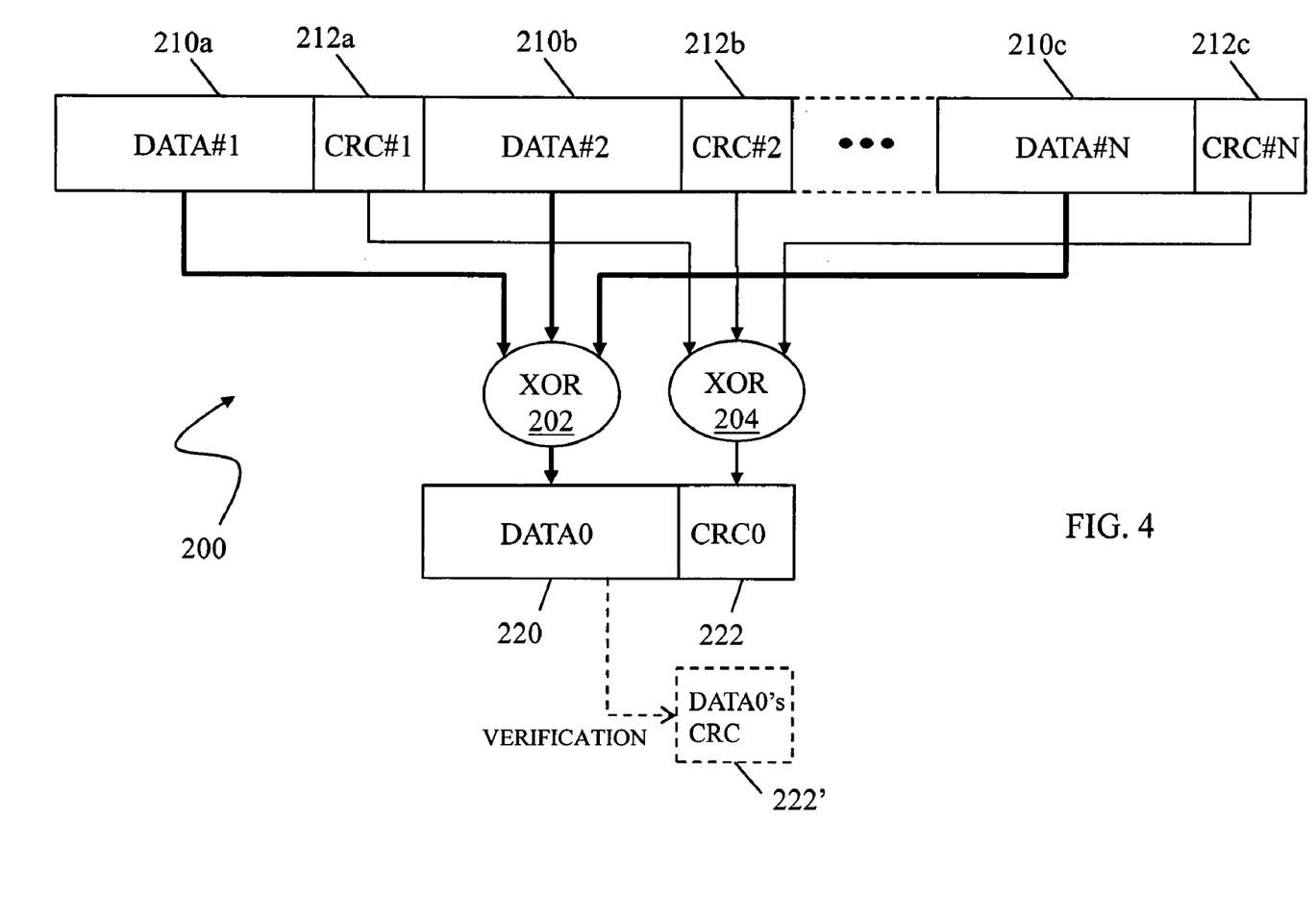
FIG. 4 is a schematic diagram showing, for a number of data blocks and CRCs, the performance of an XOR operation with each of the data blocks and an XOR operation with each of the CRCs.

FIG. 4 is a schematic diagram 200 showing, for multiple data blocks and CRCs, the performing of XOR operations with each of data blocks #1 to #N 210a, 210b, 210c and XOR operations with each of the CRCs #1 to #N 212a, 212b, 212c. The system described herein provides that, instead of computing each data block's DIF CRC during data movement, the system XORs (e.g., using an XOR operation processor 202) each of the data blocks #1 to #N 210a-c and transfers the result onto a pre-allocated buffer Data° 220 and XORs (e.g., with XOR operation processor 204) each of the blocks CRC #1 to #N 212a-c onto buffer CRC0 222. The system described herein may be implemented using a seed value that initializes the CRC with a starting value. In an embodiment, the seed value may include something other than all zeroes, such as a series of F's (FFFF).

The CRC computation for each 512 byte block may be a polynomial calculation that may cost approximately 350 ns (with respect to CPU cycles), as further discussed elsewhere herein; however, a simple XOR operation may only cost approximately 57 ns. The example calculation times are indicated for a particular processor, such as an Intel Core-2 microprocessor; however, any type of suitable processor may be used with the system described herein and have varying calculation times. Accordingly, the processor calculation times indicated herein are provided as examples only to facilitate discussion of the system described herein. It is noted that computation of a CRC is a linear operation with respect to XOR. That is:

$$CRC_a(D_1) \text{ XOR } CRC_b(D_2) = CRC_{a \text{ XOR } b}(D_1 \text{ XOR } D_2) \quad \text{Eq. 1}$$

where $D_1$ and $D_2$ are data blocks and a and b are seed values. According to the system described herein, to match each block's data (DATA#1—DATA#N) and its CRC (CRC#1-CRC#N), DATA0's CRC 222' is computed and verification is provided by matching DATA0's CRC 222' to CRC0 222. Therefore, for N being an arbitrary value greater than 0, the verification cost is on the order of (N*57+350) ns for the error detection operations according to the system described herein. When compared with (N*350) ns for the method of performing DIF CRC computations for each of the data blocks, it may be seen that the system described herein provides for a significant improvement in verification costs. As shown in this illustrated embodiment, the data blocks used in connection with the system described herein may be of a fixed length (e.g., 512 bytes); however, as further discussed elsewhere herein, the system described herein may also be used in connection with data blocks having a variable length.

Figure 5:
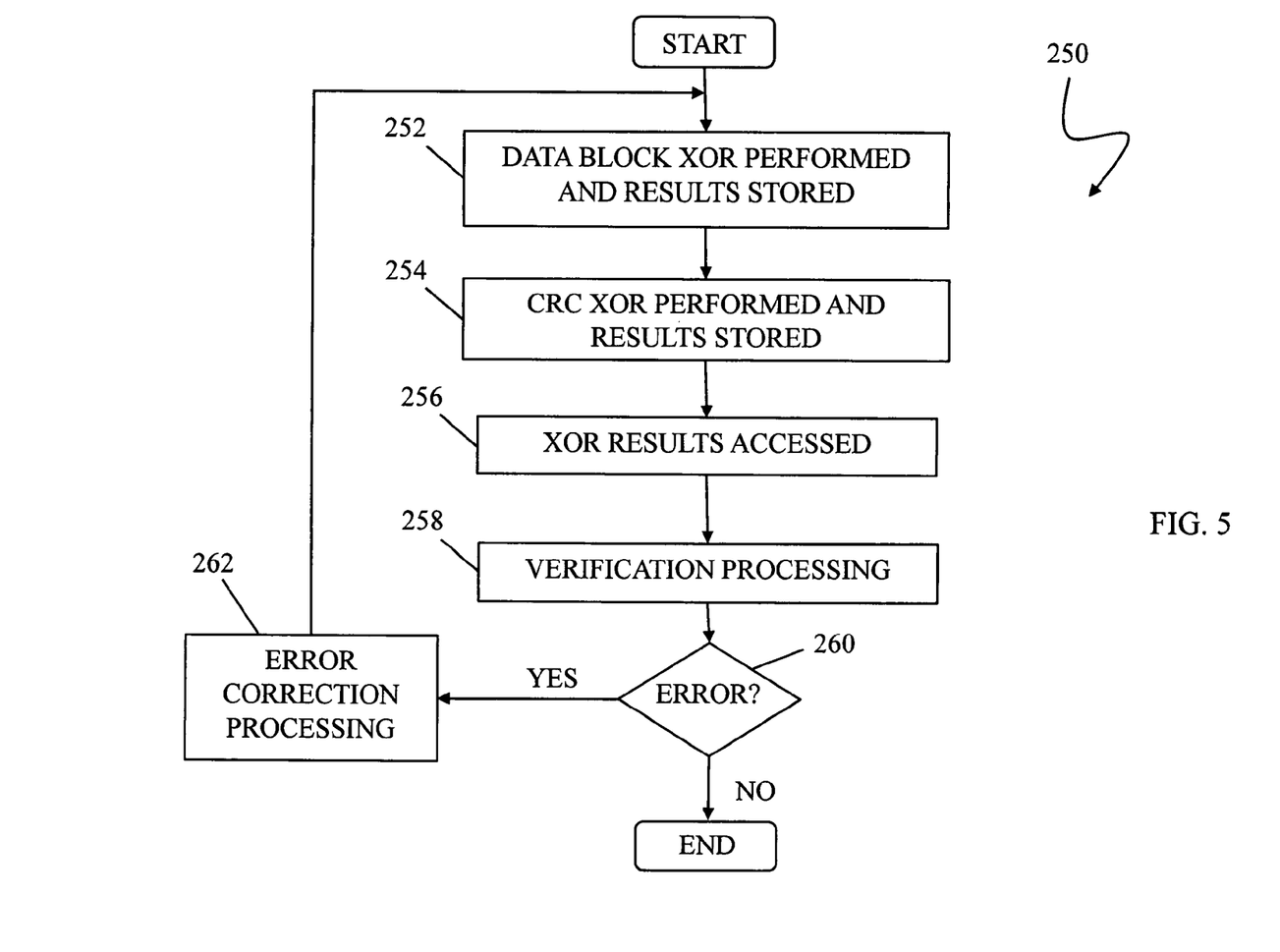
FIG. 5 is a flow diagram showing an error detecting process according to the system described herein.

FIG. 5 is a flow diagram 250 showing error detecting and verification processing according to the system described herein. At a step 252, data blocks that are being transmitted, and for which error detecting is desired, are XORd and the result stored. After the step 252, processing proceeds to at a step 254 at which the CRCs of each of the data blocks of the step 252 are XORd and the result stored. Note, that the order of performing the steps 252 and 254 is interchangeable. After the step 254, processing proceeds to at a step 256 at which the results of the data block XOR and the CRC XOR are accessed to determine whether the data blocks that have been read/received contain errors. Accessing the XOR results may include transmitting the XOR results to a device that performs the processing described herein or, alternatively, the XOR results may have been stored on a buffer that is accessed by the device. After the step 256, processing proceeds to at a step 258 at which, using the XOR results obtained at the step 256, verification processing is performed. After the step 258, processing proceeds to a test step 260 where it is determined whether the verification processing indicates that there is an error in the data. As discussed elsewhere herein, the verification process provided by the system described herein may involve computing a verification DIF CRC with respect to the XORd CRC results. If an error is determined at the step 260, then processing proceeds to a step 262 where error correction processing is performed. The error correction processing may include re-reading the data in error or having the data re-transmitted, although other error correction processes are possible. After the step 262, processing may proceed back to the step 252 for another iteration. Alternatively, if it is determined at the test step 260 that there is no error, then processing is complete.

According to various embodiments, the system described herein may be used not only in connection with local 10 transfers but also in connection with local CPU XOR operations for a RAID system in which data may be mirrored, striped or otherwise distributed across multiple storage devices or disk drives. A RAID system may provide for verification of stored data validity using a parity disk drive containing a parity array in which is stored the result of XOR operations of multiple data blocks, or portions thereof, stored in other disk drives of the RAID system. It is known that a CRC may be transmitted together with parity data associated with distributed data blocks in a RAID system, and a CRC associated with each of the received data blocks may be determined and compared with the CRC transmitted with the parity data. (See, for example, U.S. Pat. No. 7,073,024 to Chilton entitled "Data Protection Method Wherein Data Protection Code is Stored Together With Parity," which is incorporated herein by reference.) The system described herein may be advantageously used in connection with XOR operations on each block of the parity array and the CRCs associated therewith, as further discussed elsewhere herein.

Figure 6:
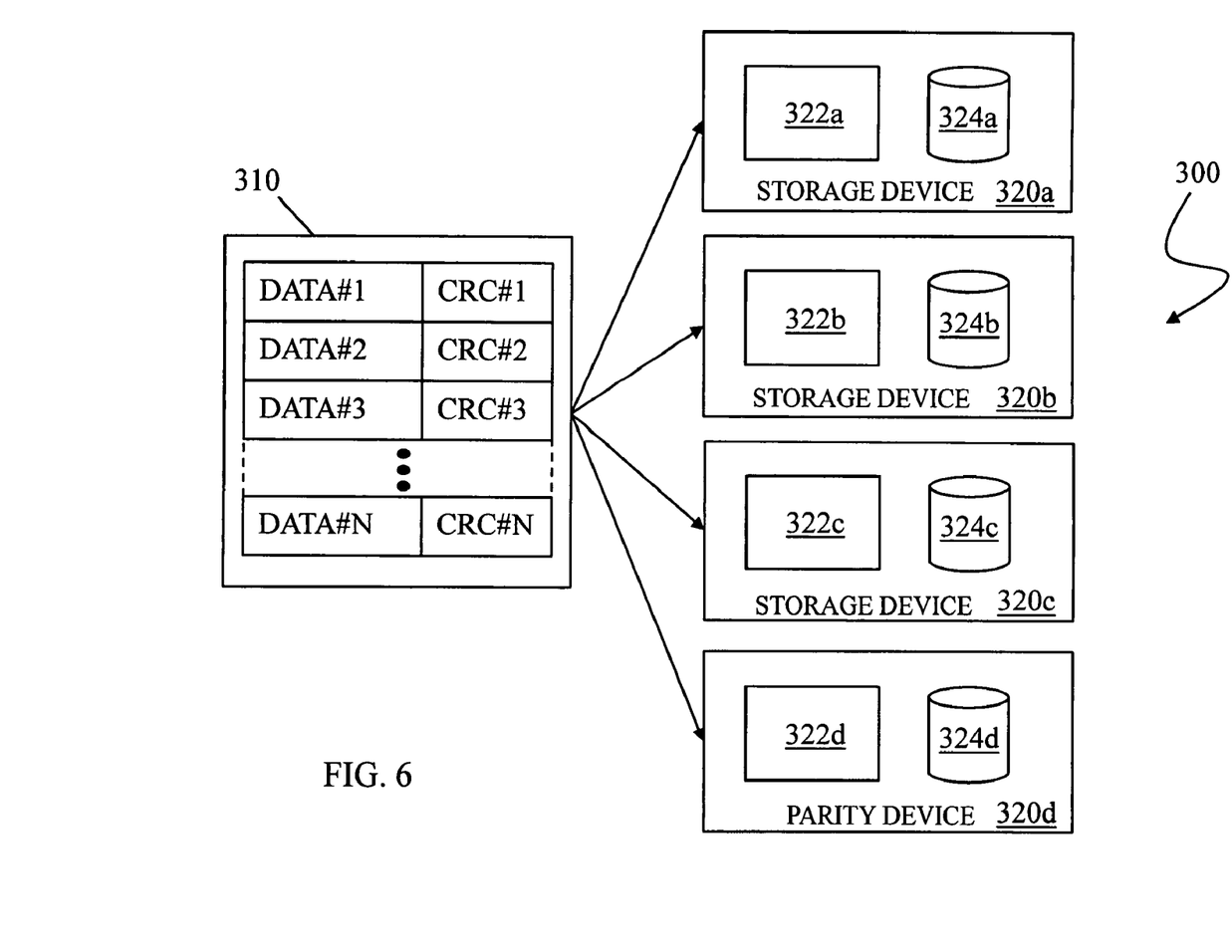
FIG. 6 is a schematic illustration of a RAID system that may used in connection with the system described herein.

FIG. 6 is a schematic illustration of a RAID system 300 that may be used in connection with the system described herein. The RAID system 300 is shown to include a data source 310, e.g. a memory, in communication with a plurality of storage devices 320a-d, that may each include at least one of the directors 322a-d coupled to at least of the one disk drives/disks 324a-d. The data source 310 is shown including a plurality of data blocks (DATA#1-DATA#N). For each of the data blocks, a CRC has been computed (CRC#1-CRC#N). The plurality of storage devices 320a-d may be devices for storing data. The storage device 320d may be a parity device with a parity director 322d and a parity disk 324d. In various embodiments, and as further discussed elsewhere herein, the system described herein may include operations involving communication between the data source 310 and the storage devices 320a-d that provides mirrored copies of the data blocks replicated across the multiple storage devices and/or operations with portions of the data blocks that are copied and distributed across the multiple storage devices (i.e. striping). In connection with striping, the parity device 320d may store the XOR of the data portions that are distributed across the storage devices 320a-c in a parity array. Although illustrated with discrete storage devices, in various embodiments, the RAID system 300 may include any number of different configurations of disks, disk drives or other storage media coupled to one or more interconnected directors, and it should be noted that other configurations and types of systems involving multiple, redundant storage may be used in connection with the system described herein. For example, parity information may be stored across the storage devices 320a-c rather than being stored in the parity device 320d.

Figure 7:
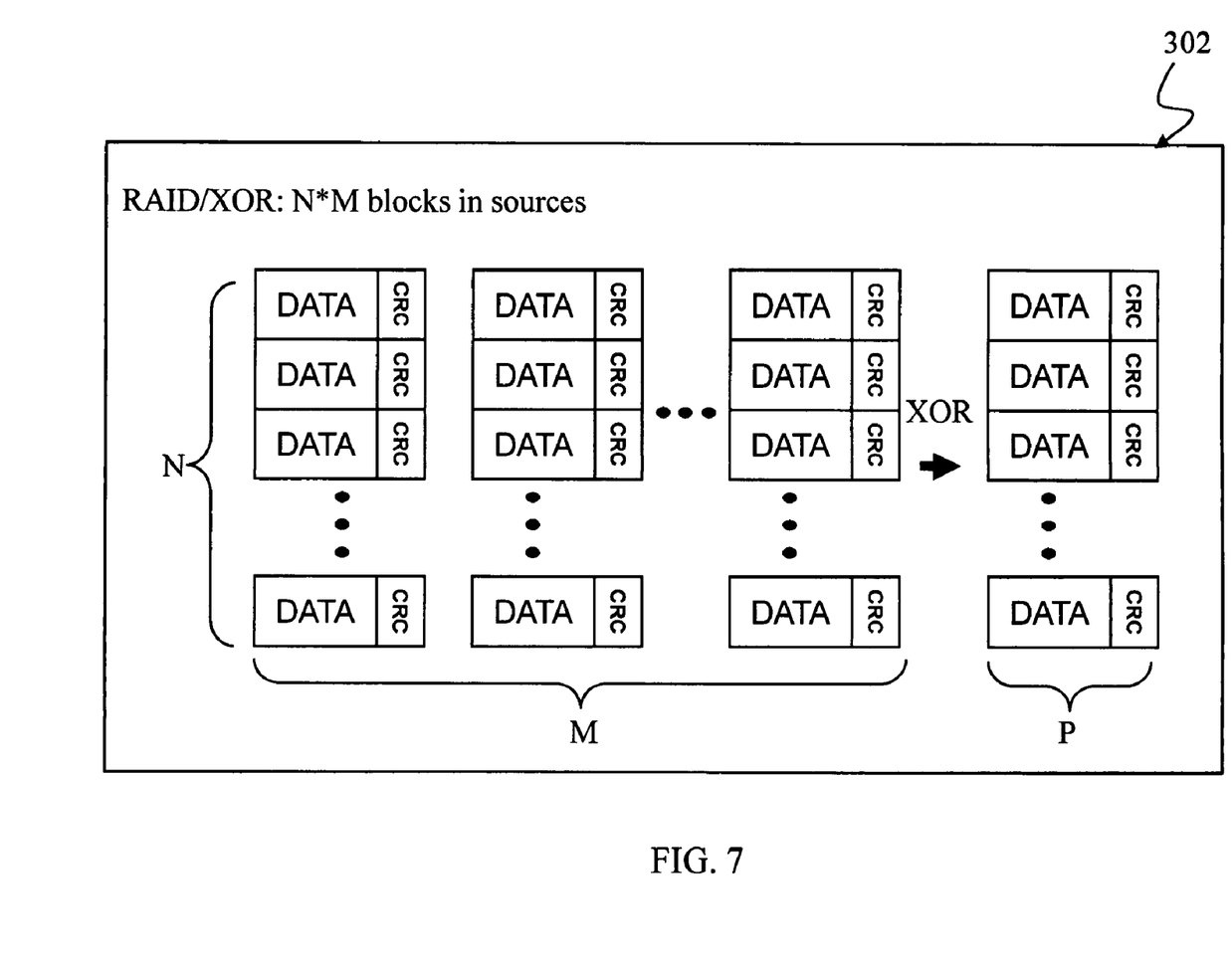
FIG. 7 is schematic illustration showing XOR operation in the RAID system, shown for N data blocks, M source arrays and a parity array P according to an embodiment of the system described herein.

FIG. 7 is schematic illustration 302 showing RAID XOR operation for N data blocks/CRCs, with M source arrays and a parity array P for use with a system according to that described herein. The parity array P is the XOR of each data source. In various embodiments, N may be 16 for a data sector and M may be 2 to 15 (e.g., 3) although it should be understood that other numbers of data blocks and sources may be used in connection with the system described herein.

Figure 8:
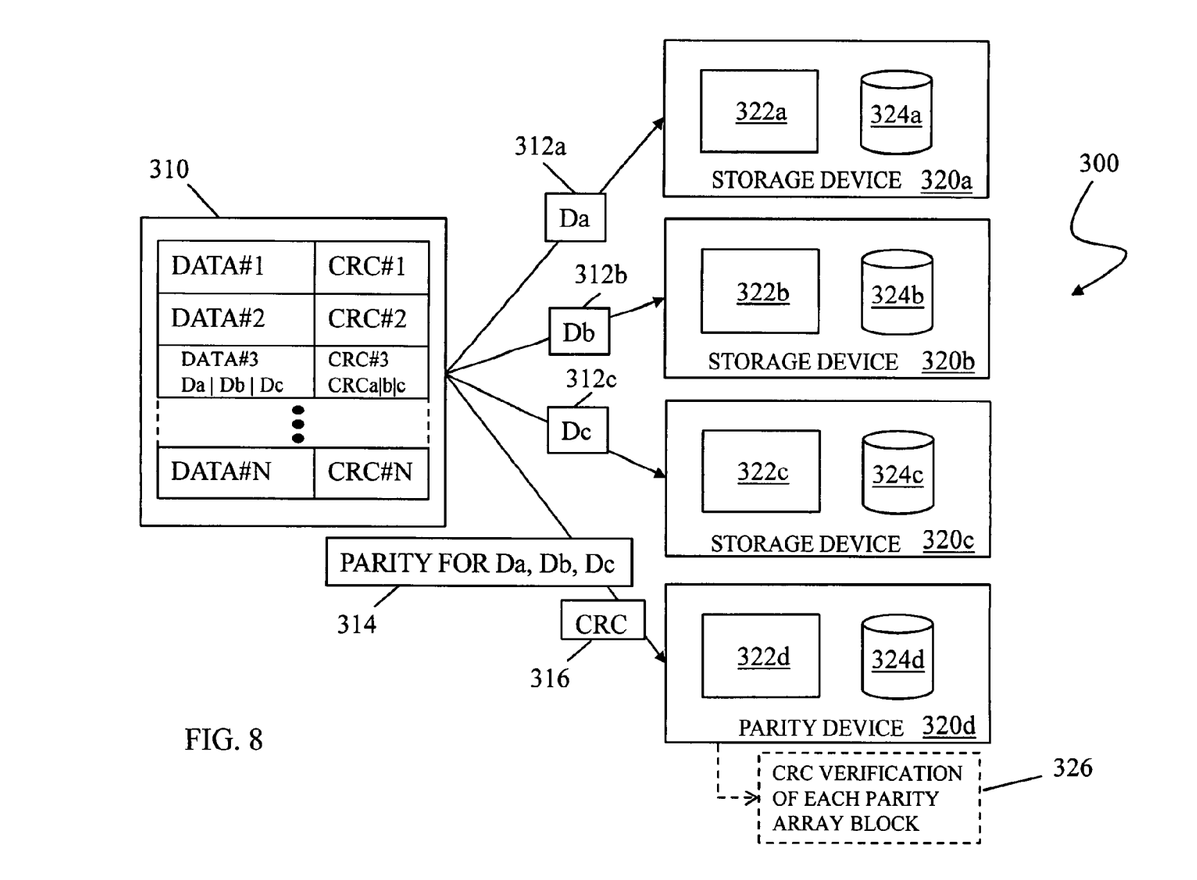
FIG. 8 is a schematic illustration showing error detection operation in the RAID system according to an embodiment of the system described herein.

FIG. 8 is a schematic illustration showing error detection operations in the RAID system 300 of FIG. 6 according to an embodiment of the system described herein. A data source is shown as including a data block DATA #3 which has three data block portions Da, Db, Dc 312a-c. The data block portions 312a-c may be copied to the storage devices 320a-c in a striping process with the RAID system 300. Parity 314 of the three data block portions 312a-c is transmitted to the parity device 320d, the parity 314 being the XOR of the data in the data block portions Da, Db, Dc 312a-c. The data source 310 stores the data block portions Da, Db, Dc and also stores the CRC computed for each of the data block portions. That is, the data block portion Da 312a has an associated CRCa, the data block portion Db 312b has an associated CRCb, and the data block portion Dc has an associated CRCc 312c that may be stored at the data source 310. The parity for each data block (e.g., the XOR of the data block portions Da, Db, Dc) is sent to the parity device 320d and stored in a parity array. A CRC 316 (CRCa-CRCc) for the data block portions may also be sent or otherwise made accessible to the parity device 320d and/or another device that may perform CRC verification. The verification CRC computations may be performed by a processor that is part of or different from the parity device 320d. For a CRC verification 326, a CRC of each block in the parity array may be computed (326) and matched with the XOR of each block's CRC in accordance with the system described herein. Thus, for an M*N block RAID/XOR operation, the cost to verify the DIF CRC according to this embodiment of the system described herein may be on the order of (N*350) ns which compares favorably to known methods for verification CRC computation for which the cost would be (M*N*350) ns. As further discussed elsewhere herein, in a particular optimized implementation in which the system described herein is applied using an entire parity array, the verification CRC computation cost may further reduce to 350 ns.

Figure 9:
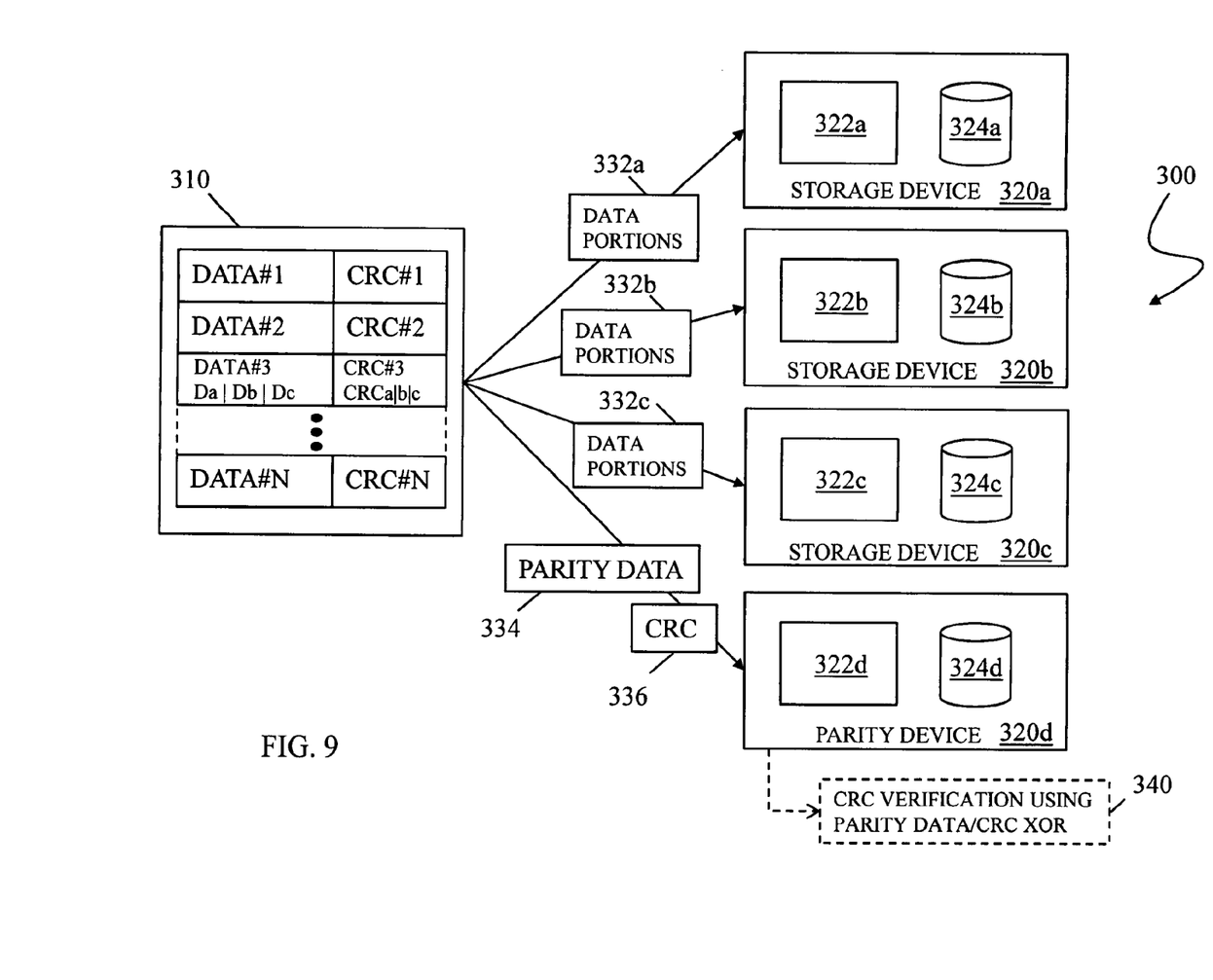
FIG. 9 is a schematic illustration showing error detection operation in the RAID system according to another embodiment of the system described herein.

FIG. 9 is a schematic illustration showing error detection operation in the RAID system 300 according to another embodiment of the system described herein. The figure shows the possibility for even further improvement in data verification costs. For the collective data portions 332a-c of a data sector from the source device 310 that are all striped across storage devices 320a-c and for which parity data 334 has been sent and stored in a parity array on the parity device 320d, the XOR of each block in the parity array and a corresponding DIF CRC 340 may be determined in accordance with the system described herein. The results of these operations may then be used for CRC verification in accordance with the processing further discussed elsewhere herein. In this way, the XOR and CRC verification costs reduce to (N*57+350) ns. The CRCs 336 for the data blocks stored in the source device 310 may be sent and/or may otherwise made accessible to the parity device 320d or other processing devices.

Figure 10:
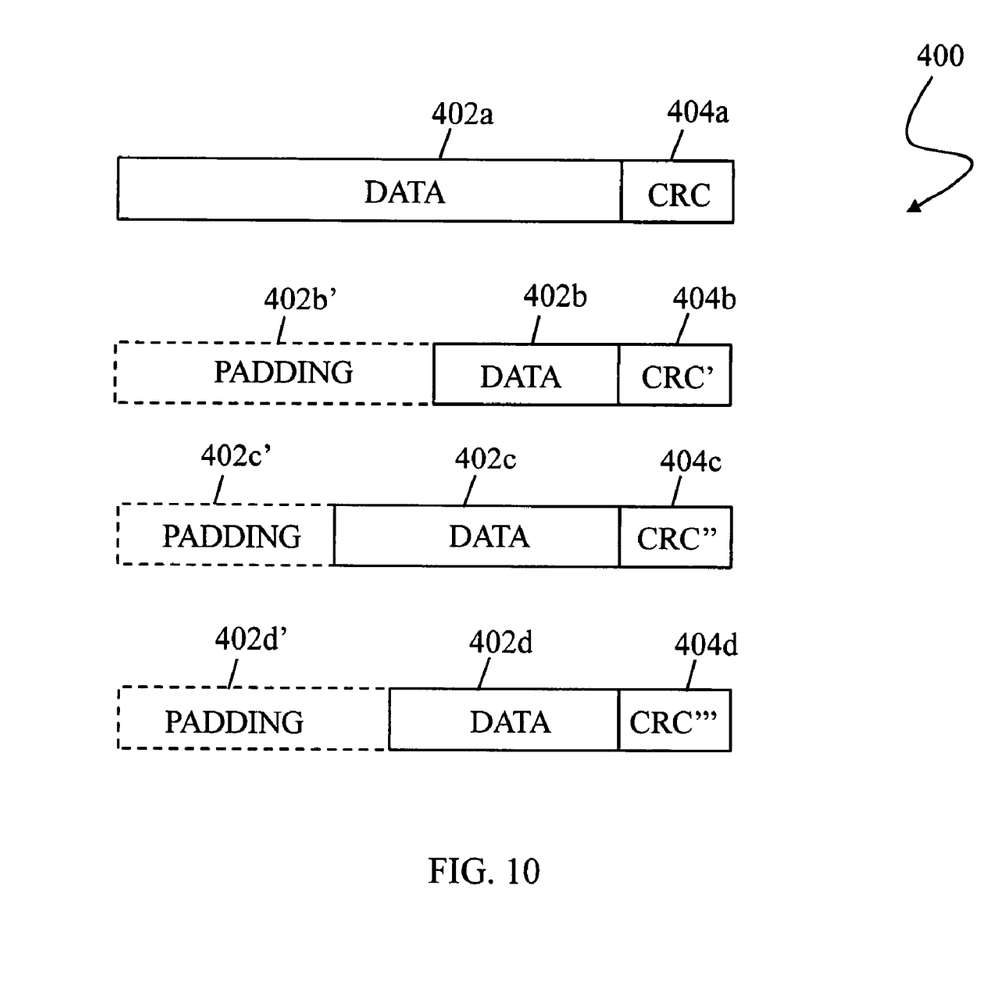
FIG. 10 is a schematic illustration showing an embodiment with data blocks having variable lengths that may be used in connection with the system described herein.

FIG. 10 is a schematic illustration 400 showing an embodiment with data blocks 402a-d having variable lengths that may be used in connection with the system described herein. Data blocks 402b-d having less than a fixed (max) size (see data block 402a) may be padded with a simulated padding 402U, 402c', 402d' having lengths to increase the smaller data blocks up to the designated fixed size (data+padding). The padding portions 402b'-c' may be simulated in that the portions are added in connection with error detecting operations performed thereon according to the system described herein, rather than being actual data padding added, for example, during transmission of the data blocks. CRCs 404a-d may be computed for each of the data blocks 402a-d. The CRCs (CRC', CRC'', CRC''') 404b-d for the data blocks 402b-d that include the padding portions 402b'-d' may each need to be adjusted based on the simulated padding that is added to bring the data blocks 402b-d to the fixed size. Following adjustment of the CRCs 404b-d, the algorithm of the system described herein may be applied to the data blocks 402a-d. Processing variable length data blocks according to the system described herein may be advantageously applied to, for example, communications.

It may be noted that the reduction in transfer cost that is achieved according to the system described herein there may also result in a reduction in the strength of the CRC data integrity protection that is provided. Specifically, for example, under the known CRC verification techniques, for 16 bit DIF CRC the probability that the verification will not catch the corruption may be $(1/64K)^L$, where L is the number of corrupted blocks and indicating that the probability is dependent on the number of corrupted blocks (L). However, under the system described herein, for 16 bit DIF CRC the probability that the data corruption is not caught may be only $1/64K$ regardless of the number of corrupted blocks (L). Accordingly, there may be a trade-off between speed and strength of verification, and, as a result, the known techniques for CRC verification processing and the CRC verification techniques described herein may be combined in appropriate combinations depending on the particular circumstances required for specific CRC verification processing needs.

Various of the embodiments discussed herein may be combined with each other in appropriate combinations in connection with the system described herein. Further, the system described herein may be implemented using software, hardware, and/or a combination of software and hardware. Software implementations of the system described herein may include executable code that is stored in a computer readable storage medium and executed by one or more processors. The computer readable storage medium may include a computer hard drive, ROM, RAM, flash memory, portable computer storage media such as a CD-ROM, a DVD-ROM, a flash drive and/or other drive with, for example, a universal serial bus (USB) interface, and/or any other appropriate storage medium or computer memory on which executable code may be stored and executed by a processor. The system described herein may be used in connection with any appropriate operating system.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A method for detecting data errors in connection with a data transfer process, comprising:
    transferring a plurality of data blocks and a plurality of error detecting codes from a first memory location to a second memory location;
    performing an XOR operation on the plurality of data blocks transferred to the second memory location to obtain a data block XOR result;
    performing an XOR operation on the plurality of error detecting codes transferred to the second memory location and associated with the plurality of data blocks to obtain an error detecting code XOR result, wherein the plurality of error detecting codes are cyclic redundancy checks (CRCs); and
    determining whether an error exists in the plurality of data blocks transferred to the second memory location using the data block XOR result and the error detecting code XOR result, wherein determining whether an error exists in the plurality of data blocks includes:
    computing a CRC of the data block XOR result; and
    matching the computed CRC of the data block XOR result to the error detecting code XOR result.

2. The method according to claim 1 wherein the CRCs are in data interchange format (DIF).

3. The method according to claim 1, wherein the data block XOR result and the error detecting code XOR result are stored in a memory.

4. The method according to claim 1, wherein the plurality of data blocks are transmitted from a data source.

5. The method according to claim 1, wherein the data transfer process includes distributing mirrored versions of the plurality of data blocks across multiple storage devices.

6. The method according to claim 1, wherein at least one of the plurality of data blocks includes a plurality of data portions that are distributed across multiple storage devices.

7. The method according to claim 6, wherein parity information is generated and stored for the plurality of data portions.

8. The method according to claim 7, wherein the data block XOR result is generated by applying the XOR operation to the parity information.

9. A non-transitory computer readable storage medium storing executable code for detecting data errors in connection with a data transfer process, comprising:
    executable code that transfers a plurality of data blocks and a plurality of error detecting codes from a first memory location to a second memory location;
    executable code that performs an XOR operation on the plurality of data blocks transferred to the second memory location to obtain a data block XOR result;
    executable code that performs an XOR operation on the plurality of error detecting codes transferred to the second memory location and associated with the plurality of data blocks to obtain an error detecting code XOR result; and
    executable code that determines whether an error exists in the plurality of data blocks transferred to the second memory location using the data block XOR result and the error detecting code XOR result, wherein the executable code that determines whether an error exists in the plurality of data blocks includes:
    executable code that computes a CRC of the data block XOR result; and
    executable code that matches the computed CRC of the data block XOR result to the error detecting code XOR result.

10. The computer readable storage medium according to claim 9, wherein the data transfer process includes distributing mirrored versions of the plurality of data blocks across multiple storage devices.

11. The computer readable storage medium according to claim 9, wherein at least one of the plurality of data blocks includes a plurality of data portions that are distributed across multiple storage devices.

12. The computer readable storage medium according to claim 11, wherein parity information is generated and stored for the plurality of data portions.

13. The computer readable storage medium according to claim 12, wherein the data block XOR result is generated by applying the XOR operation to the parity information.

14. A computer system for detecting data errors in connection with a data transfer process, comprising:
    a plurality of interconnected directors, wherein at least some of the directors handle reading and writing data for the computer system;
    a plurality of disk drives, coupled to at least some of the directors, that store data for the computer system; and
    computer software, stored in a computer readable storage medium of at least one of the directors, the software having:
    executable code that transfers a plurality of data blocks and a plurality of error detecting codes from a first memory location to a second memory location;
    executable code that performs an XOR operation on the plurality of data blocks transferred to the memory location to obtain a data block XOR result;
    executable code that performs an XOR operation on the plurality of error detecting codes transferred to the memory location and associated with the plurality of data blocks to obtain an error detecting code XOR result; and
    executable code that determines whether an error exists in the plurality of data blocks transferred to the memory location using the data block XOR result and the error detecting code XOR result, wherein the executable code that determines whether an error exists in the plurality of data blocks includes:
    executable code that computes a CRC of the data block XOR result; and
    executable code that matches the computed CRC of the data block XOR result to the error detecting code XOR result.

15. The computer system according to claim 14, wherein the data transfer process includes distributing mirrored versions of the plurality of data blocks across multiple storage devices.

16. The computer system according to claim 14, wherein at least one of the plurality of data blocks includes a plurality of data portions that are distributed across multiple storage devices.

17. The computer system according to claim 16, wherein parity information is generated and stored for the plurality of data portions.

18. The computer system according to claim 17, wherein the data block XOR result is generated by applying the XOR operation to the parity information.

* * * * *